Nov. 3, 1925.
H. REICHEL
TIRE BUFFER
Filed Sept. 24, 1924
1,559,588
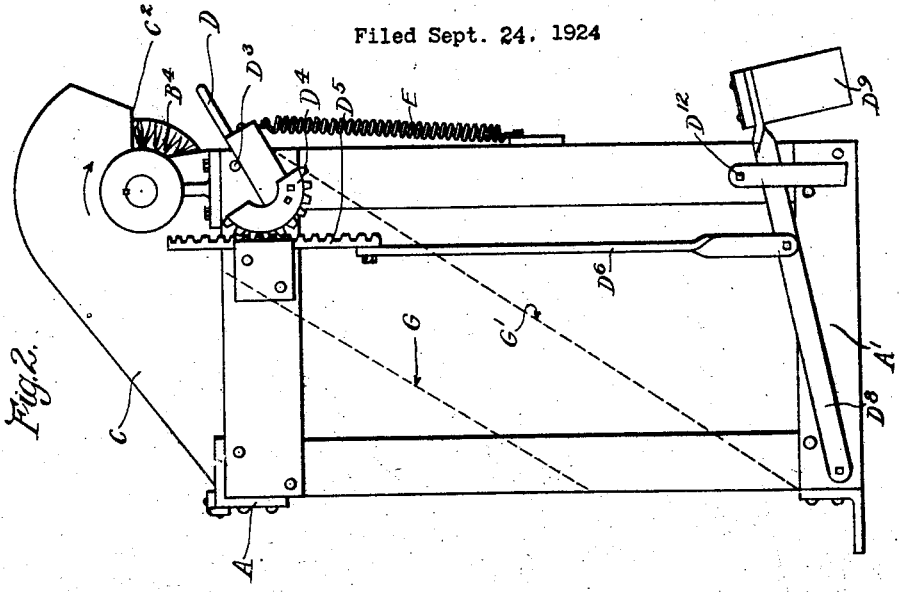
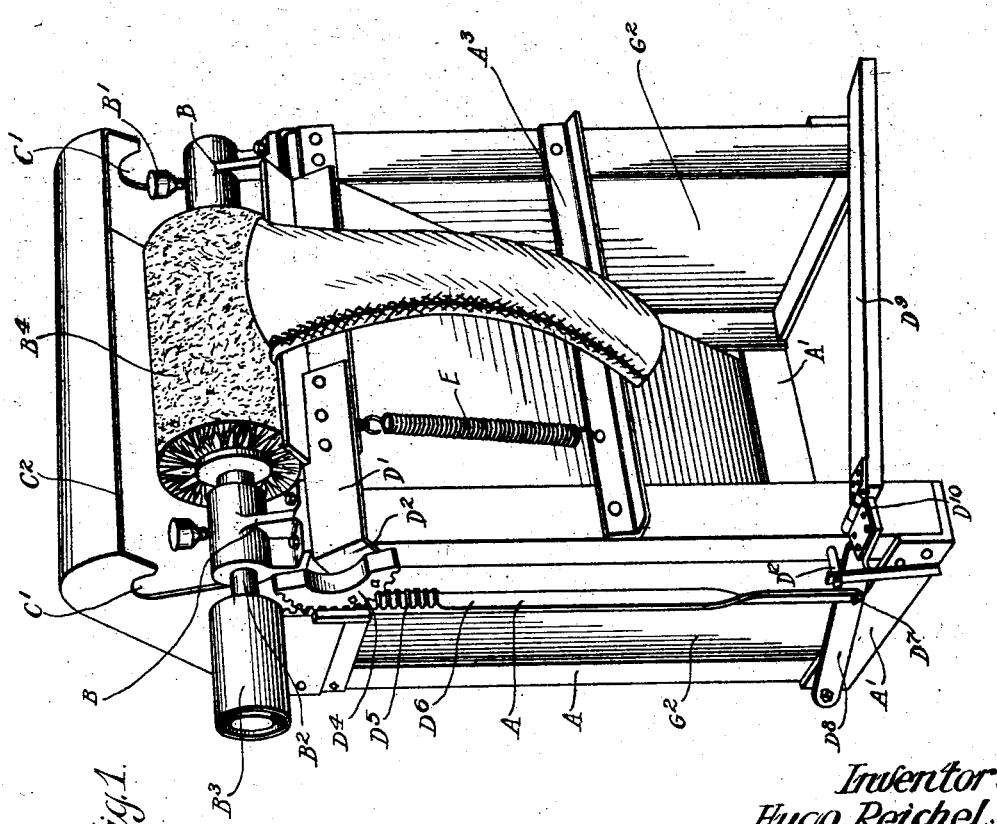
Inventor:
Hugo Reichel.
by Parker & Carter Attys.

Patented Nov. 3, 1925.

1,559,588

UNITED STATES PATENT OFFICE.

HUGO REICHEL, OF CHICAGO, ILLINOIS.

TIRE BUFFER.

Application filed September 24, 1924. Serial No. 739,518.

*To all whom it may concern:*

Be it known that I, HUGO REICHEL, a citizen of the United States, residing at Chicago, in the county of Cook and State of Illinois, have invented a certain new and useful Improvement in a Tire Buffer, of which the following is a specification.

My invention relates to a buffer for tires, and particularly to a buffer for removing from the rubber portion of the tire casing such glue and fabric or other materials as adhere to it after the fabric portion of the tire has been separated therefrom. Other objects will appear from time to time in the course of the specification and claims.

I illustrate my invention more or less diagrammatically in the accompanying drawings wherein—

Figure 1 is a perspective view of the device; and

Figure 2 is a side elevation.

Like parts are illustrated by like symbols throughout the specification and drawings.

I employ any suitable supporting frame. It may include, for example, the corner piece A, herein shown as angle irons, which may be secured together at the bottoms by the transverse elements $A^1$ and at their tops by the transverse frame elements $A^2$ and by the intermediate element $A^3$.

Secured to the top of the frame are any suitable bearing elements B having oil cups $B^1$ in which rotates a shaft $B^2$ provided with a pulley $B^3$ and a stiff brush $B^4$, preferably of metallic bristles. The details of the brush herein form no part of the present invention, but it is shown as of cylindrical form.

C is an inclosing hood preferably, but not necessarily, pivoted along its rear to the rear of the supporting frame. It is cut away as at $C^1$ to conform to the bearings B and is provided with a downwardly turned lip $C^2$ which, when the hood is in its lowest position, almost completely masks the brush $B^4$.

D is a supporting and pressure plate mounted, for example, on the transverse element $D^1$, the rearwardly turned ends $D^2$ of which are pivoted as at $D^3$ on the frame. They are provided with segments $D^4$ in mesh with the rack $D^5$ on the upper end of the vertical rod $D^6$, the lower end of which is pivoted as at $D^7$ to the pivoted rod $D^8$, to the outer end of which in turn is pivoted the tread plate $D^9$, hinged to it as at $D^{10}$. The outer end of the tread plate $D^9$ is free and normally rests on the floor. $D^{12}$ is any suitable stop for limiting the upward movement of the pivoted bar $D^8$ and it thus limits the downward movement of the plate D in response to the later described spring E.

E is any suitable tension element, for example a spiral spring, one end of which is secured to the frame element $A^3$ and the opposite end to the supporting plate D or its supporting element $D^1$. The spring E normally holds the plate D withdrawn from contact with the brush when the foot of the operator is removed from the tread plate $D^9$.

G, $G^1$ are respectively the upper and lower walls of a chute or vent extending downwardly from the brush $B^4$ to the rear of the supporting frame, and discharging into the atmosphere on the side of the frame opposite to the operator. The sides of the chute and of the supporting frame may be closed, for example by the plates $G^2$.

It will be realized that while I have illustrated a working device, nevertheless many changes might be made in the size, shape, number, relation and disposition of parts without departing from the spirit of my invention, and I wish my description and drawings to be taken as in a broad sense illustrative rather than as limiting me to the specific form and operation herein described and shown.

The use and operation of my invention are as follows:

When the foot of the operator is not exerting pressure on the tread plate or bar $D^9$ the supporting plate D is withdrawn from contact with the brush in the position shown in Figure 2. The article to be buffed is then passed over the plate, its end sliding down along the plate $G^1$ of the discharge chute only sufficient of the article being left above the plate D to permit the operator to get a good hold on it with his hands. When the article is thus positioned, the operator steps on the tread plate $D^9$ and thus moves the plate D and the article thereon against the moving brush. The operator obtains the pressure he desires by varying the weight he places upon the element $D^9$. When he has properly adjusted the weight he is exerting, he draws the article being buffed towards him across the plate D and against the movement of the brush which rotates in the direction of the arrow in Figure 2. The combined effect of the rotation of the brush and of the forward movement of the article being buffed is sufficient thoroughly to cleanse it of the foreign material adhering thereto, and of course every portion of the article is contacted by the brush except the end held by the hand of the operator. This can be buffed by simply reversing the article and buffing off the opposite end.

I claim:

1. In a buffer, a brush and means for rotating it, a supporting element pivoted adjacent said brush and adapted to support the article to be buffed, yielding means for holding said supporting element normally withdrawn from contact with said brush, and means for rotating it toward said brush, comprising a segment, a rack in mesh with said segment, and a treadle element, connected to said rack, and adapted to be contacted by the foot of the operator.

2. In a buffer, a brush and means for rotating it, a supporting element in opposition to said brush and adapted to support the article to be buffed, means for holding said supporting element normally withdrawn from contact with the brush and means for moving it against said brush, a housing for and partly enclosing said buffer comprising in part a hood overhanging said brush, and an inclined passage way extending downwardly from beneath said brush to the rear of the housing.

Signed at Chicago, county of Cook and State of Illinois, this 20th day of September 1924.

HUGO REICHEL.